Feb. 7, 1956     T. E. DUGLE ET AL     2,733,555
SERVO TRACKING DEVICE FOR ENDLESS MEMBERS
Filed March 2, 1954                          4 Sheets—Sheet 1

INVENTORS
THOMAS E. DUGLE
CARL E. CLUTTER
BY ALVIN F. ALT

J. Warren Kinney, Jr.
ATTORNEY

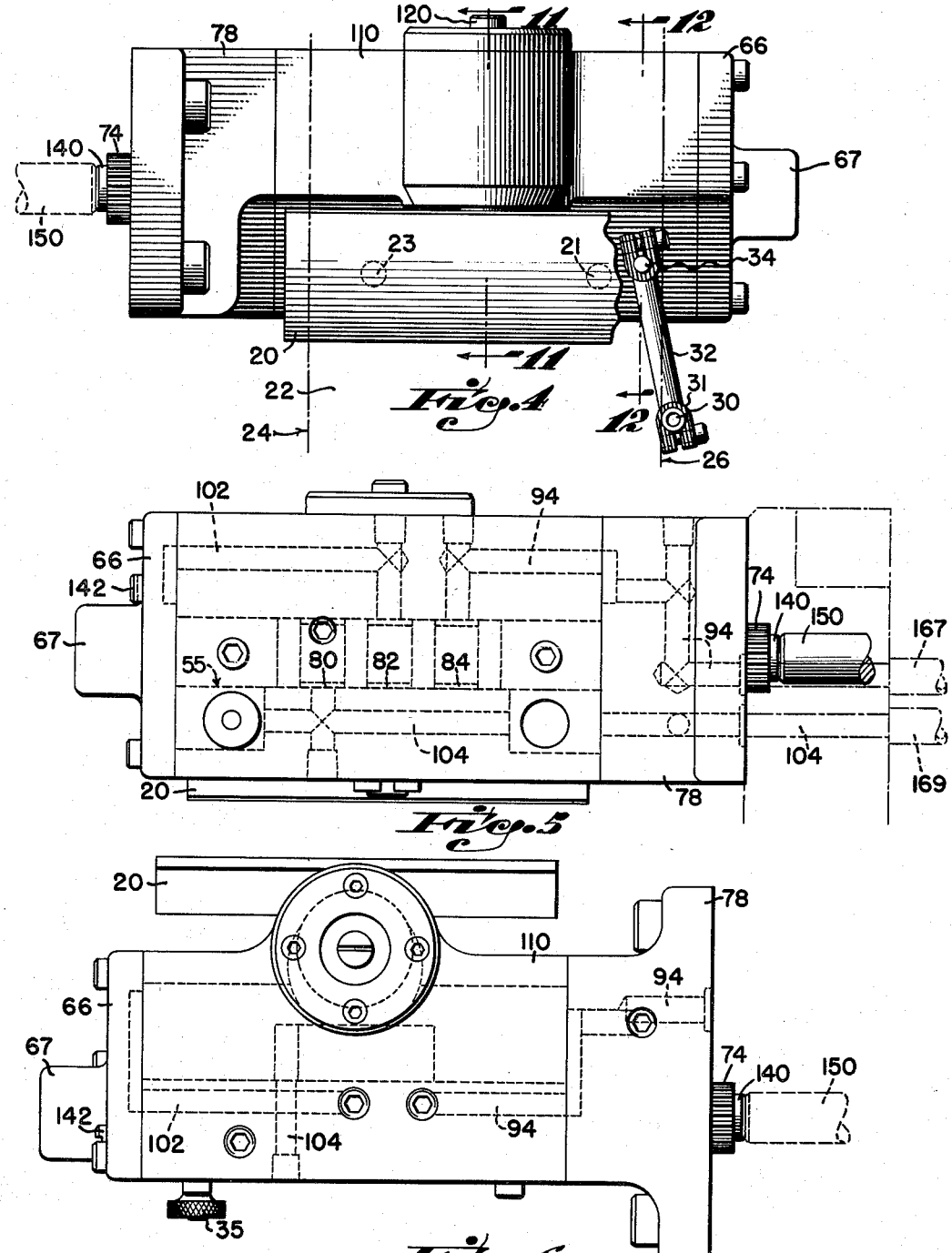

Feb. 7, 1956 T. E. DUGLE ET AL 2,733,555
SERVO TRACKING DEVICE FOR ENDLESS MEMBERS
Filed March 2, 1954 4 Sheets-Sheet 3

INVENTORS
THOMAS E. DUGLE
CARL E. CLUTTER
BY ALVIN F. ALT
J. Warren Kinney, Jr.
ATTORNEY

INVENTORS
THOMAS E. DUGLE
CARL E. CLUTTER
BY ALVIN F. ALT

ATTORNEY

United States Patent Office 2,733,555
Patented Feb. 7, 1956

2,733,555

SERVO TRACKING DEVICE FOR ENDLESS MEMBERS

Thomas E. Dugle, Cincinnati, Carl E. Clutter, Mason, and Alvin F. Alt, Deer Park, Ohio, assignors to Planet Products Corporation, Cincinnati, Ohio, a corporation of Ohio Application March 2, 1954, Serial No. 413,643

11 Claims. (Cl. 51—135)

This invention relates to a servo tracking device for endless members, such as belts, webs or the like, the widths of which are less than the width of a tracking shoe over which the endless members pass.

An object of the invention is to provide a tracking device for automatically maintaining the desired axial alignment of an endless member, such as a belt, or the like, by means of a servo-actuated tracking shoe over which the endless member passes.

Another object of the invention is to provide a servo tracking device in the form of a compact unit which may be associated with or attached to existing machines utilizing endless members, such as, by way of example, conventional belt grinders, for improving and accurately controlling the tracking characteristics of the endless members, thereby increasing the overall efficiency of the machine.

A further object of the invention is to provide a servo tracking device which includes simple, easily accessible means for enabling an operator to alter the operating characteristics of the device while an endless member is passing over the tracking shoe thereof.

Another object of the invention is to provide a servo tracking device which is so constructed and arranged as to facilitate its mass production for both a right and left mounting whereby only the end plates differ, all the other elements of the device being reversible.

Another important object of the invention is to provide a servo tracking device which may be automatically operated for controlling the tracking of an endless member passing over a shoe to a substantially fixed axial path, or which may be automatically operated for imparting a predetermined, cyclic sidewise motion to the endless member.

A further object of the invention is to provide a servo tracking device having the hereinabove described characteristics which includes a conveniently accessible, outwardly projecting, axially shiftable element which may be actuated by any suitable external means for imparting cyclic sidewise motion to an endless member passing over the tracking shoe.

These and other objects are attained by the means described herein and as disclosed in the accompanying drawings, in which:

Fig. 4 is a front elevation of a servo tracking device, per se.

Fig. 5 is a rear view of the device of Fig. 4.

Fig. 6 is a top view of Fig. 5.

At the outset it should be understood that present invention is directed to a tracking device for webs the widths of which are equal to or less than the width of a tracking shoe over which the webs are passed, as contrasted with and distinguished from the well established cumbersome means for guiding wide webs of material by passing them over wider rollers which are mounted so that one end may be shifted relative to an opposite end.

The servo tracking device comprises a tracking shoe 20 over which an endless member or belt 22 passes, said member including opposite side edges 24 and 26. Edge 26 of the endless belt normally contacts finger 30, and sidewise shifting of the belt relative to tracking shoe 20 will result in a corresponding movement of the finger to the right or to the left. This finger movement is utilized for controlling a servo mechanism which is operative to impart a selective tilting motion to the tracking shoe for shifting the belt passing thereover back to its original, desired or normal position thereon.

Figure 7:
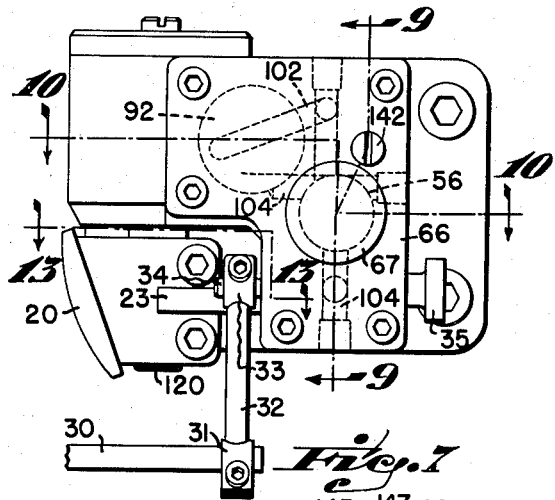
Fig. 7 is a view of the right end of Fig. 4.
Figure 8:
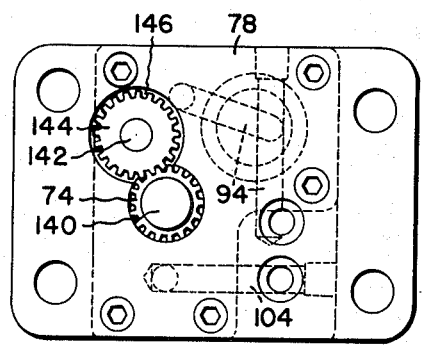
Fig. 8 is a view of the left end of Fig. 4.

With particular reference now to Figs. 4 and 7, it will be noted that finger 30 is secured by clamp 31 to arm 32 which is secured by clamp 33 to rotatable shaft 34.

Figure 9:
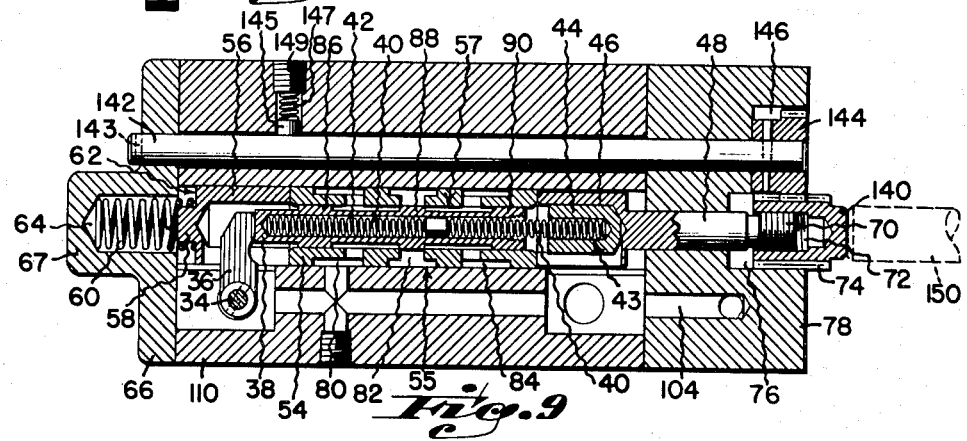
Fig. 9 is a sectional view taken on line 9—9 of Fig. 7.
Figure 12:
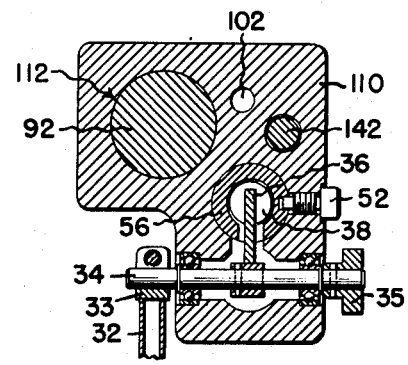
Fig. 12 is a sectional view taken on line 12—12 of Fig. 4.

As best illustarted in Figs. 9 and 12, a lever 36 is secured to shaft 34, the free end of the lever abutting against an end of an axially shiftable valve spool 38 which is normally and yieldably maintained in contacting relationship with lever 36 by means of springs 40. Spool 38 is provided with a bore 42 in which the springs are partially received. The free end of the spring which projects from the spool is received within axial bore 43 of cap 44.

Figure 10:
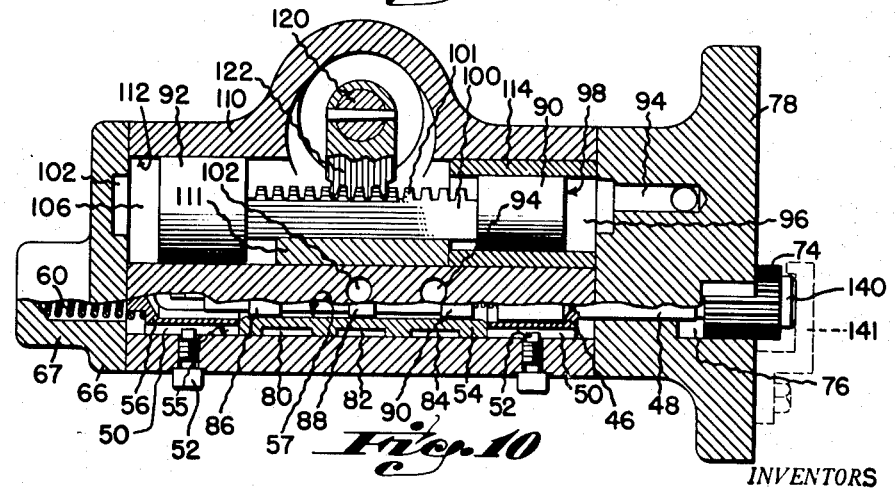
Fig. 10 is a sectional view taken on line 10—10 of Fig. 7.

Cap 44 is received within socket 46 of shaft 48, said socket including a key-way 50 engageable by pin 52, note Fig. 10, for limiting the socket to endwise or axial movement only.

A sleeve 54 is slidably received within bore 55 of housing 110, said sleeve including an axial bore 57 in which the spool 38 is received for endwise axial movement.

The left, or free end of socket 46 engages the right end of sleeve 54, whereas the left end of the sleeve is engaged by the right, or free end of socket 56 carried by guide shaft 58 for a spring 60, one end of which abuts against the left or rear end 62 of socket 56, the other end of which is seated within bore 64 in boss 67 of end plate 66.

That end of shaft 48 remote from socket 46 terminates in a threaded portion 70 which engages the internally threaded socket 72 of a spur gear 74 rotatably received within well 76 of end plate 78.

The outer end of gear 74 is provided with a bearing member or end cap 140 which abuts against a fixed stop 141, denoted in broken outline in Fig. 10, or against the end of an axially shiftable shaft 150, Figs. 2, 3, 5, 6 and 9, or other suitable abutment which fixedly or movably opposes the counterforce of spring 60.

Sleeve 54 is provided with three ports 80, 82 and 84, wherein port 80 comprises an exhaust port, 84 a pressure port, and 82 an intermediate port which may be connected to either pressure or exhaust. Spool 38 is provided with lands 86, 88 and 90 which co-operate with the sleeve ports for selectively controlling the flow of pressure media to and from cylinder 106, Fig. 10.

With particular reference now to Fig. 10, it will be noted that the numeral 94 denotes generally a pressure or supply line provided in end plate 78 for normally and continuously supplying pressure to cylinder 96 and against end face 98 of piston 90.

Figure 11:
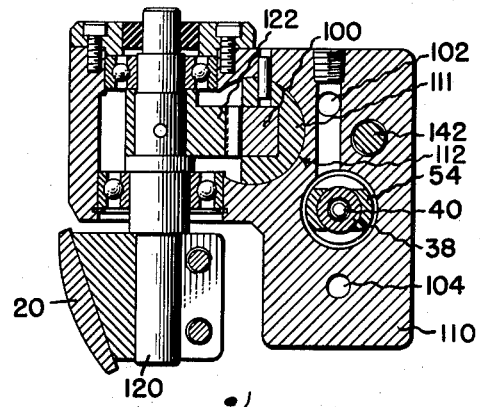
Fig. 11 is a sectional view taken on line 11—11 of Fig. 4.

Pistons 90 and 92 are rigidly interconnected by means of a rack 100, and in the preferred embodiment of the invention piston 92 has approximately twice the area of piston 90. The numeral 111, Figs. 10 and 11, denotes a rack guide.

With reference now to Fig. 5, the pressure lines have been indicated by the numeral 94 and the exhaust lines by the numeral 104. The line by which intermediate port 82 is connected to the outer end of cylinder 106 is indicated by the numeral 102.

In passing it will be noted that housing 110, in which cylinders 96 and 106 are provided, may be so constructed as to permit it to be used as a right or left hand device, that is, pistons 90 and 92 and end plates 66 and 78 may be reversed end for end from the positions illustrated in Figs. 9 and 10. Housing 110 is provided with a through bore 112 which provides the cylinder wall for piston 92. An adapter sleeve 114 may be utilized for restricting bore 112 to provide cylinder 96 to accommodate piston 90.

With reference now to Fig. 4, it will be noted that when belt 22 is shifted toward the right, finger 30, arm 32 and shaft 34 will be moved in a counter-clockwise direction.

At this point it should be understood that counter-clockwise rotation of shaft 34 of Fig. 4 will occur as clockwise rotation of the shaft as illustrated in Fig. 9. Lever 36 will therefore be turned in a clockwise direction for bodily shifting spool 38 to the right against the counterforce of spring 40, thereby shifting land 88 to the right, for establishing communication between exhaust port 80 and intermediate port 82 for thereby connecting cylinder 106 to exhaust. The pressure in cylinder 96 against face 98 of piston 90 will thereupon result in shifting of pistons 90, 92 and rack 100 to the left. Axial movement of the rack is translated into rotary movement of shaft 120 to which tracking shoe 20 is secured, it being noted (see Fig. 10) that shaft 120 is keyed to a gear segment 122 which is in driving relationship with the teeth 101 of rack 100. Therefore, movement or rack 100 to the left will impart a clockwise rotation to shaft 120 for tilting shoe 20 in a clockwise direction, as viewed in Fig. 13, whereby to shift belt 22 to the left, as viewed in Fig. 4.

Figure 13:
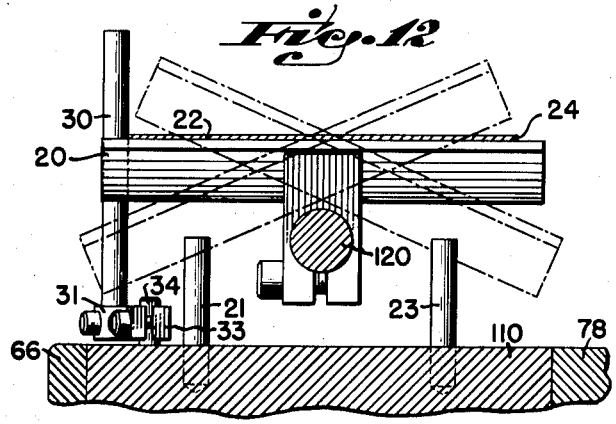
Fig. 13 is a sectional view taken on line 13—13 of Fig. 7.

If the belt should shift further to the left than its predetermined "central" position, lever 36 will be moved in a counter-clockwise direction (as viewed in Fig. 9) whereby spool 38 will be shifted axially to the left by spring 40, for establishing communication between pressure port 84 and intermediate port 82, for introducing pressure media via conduits 102 into cylinder 106 to shift pistons 90, 92 and rack 100 to the right, for thereby tilting shoe 20 in a counter-clockwise direction as viewed in Fig. 13.

With reference to Fig. 9, it will be noted that the relationship between the spool 38 and sleeve 54 may be selectively altered by imparting axial movement to the sleeve, such as, by way of example, by means of axial movement of socket 46, it being noted that socket 46 may be shifted axially incident to the application of an endwise movement to shaft 48.

In order to facilitate axial adjustment of shaft 48, a shaft 142 is provided through end plates 66, 78 and body 110, said shaft having a spur gear 144 secured to that end which terminates in well 146 of end plate 78. Rotation of gear 144 will drive gear 74 relative to shaft 48, which it threadably engages for imparting axial endwise movement to the shaft which is prevented from rotating by reason of key 52 engaging key-way 50 of socket 46, Fig. 10.

In the preferred embodiment of the invention the other end of shaft 142 projects forwardly of end plate 66, and is provided with a slot 143 to accommodate the bit of a screw-driver or the like.

As illustrated in Fig. 9, friction means including a friction shoe 145, spring 147, and plug 149 receivable in a suitable bore in housing 110 may be provided for precluding accidental end/or unintentional turning of shaft 142.

A knob 35 is preferably secured to and carried by that end of shaft 34 remote from clamp 33 (Figs. 6, 7 and 12) for set-up purposes, said knob enabling an operator to conveniently hold shaft 34 in desired position incident to adjustment of clamp 33 thereto.

Stop pins 21 and 23 (Figs. 4, 7 and 13) are secured to and project from body 110 on opposite sides of shaft 120 for limiting the maximum tilt of shoe 20.

Figure 2:
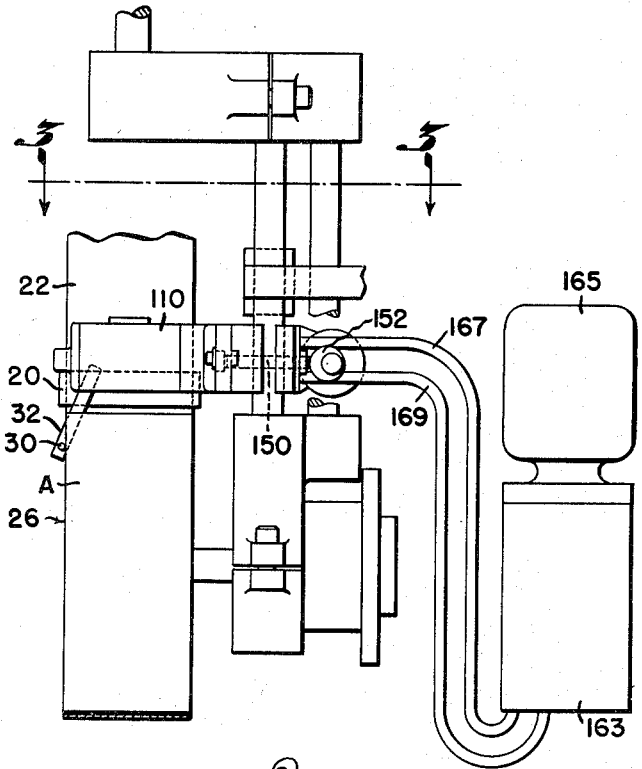
Fig. 2 is a partial front view of the device of Fig. 1.
Figure 3:
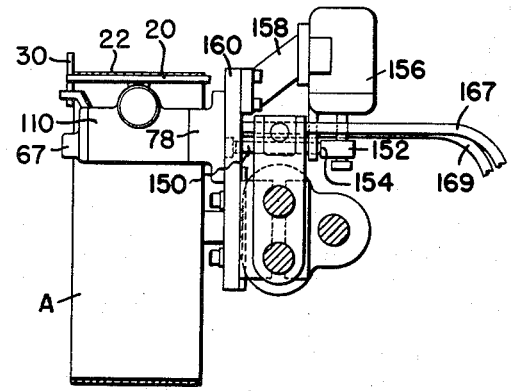
Fig. 3 is a view taken on line 3—3 of Fig. 2.

In certain instances it is desirable to impart a cyclic sidewise movement to a belt, which movement may be effectively accomplished by imparting cyclic endwise axial motion to shaft 48 such as by means of an axially shiftable rod 150, note Figs. 5, 2 and 3. Axial movement of rod 150 will be transmitted to spool 38 relative to sleeve 54. Movement of shaft 48 to the left results in port 82 being connected to exhaust line 104, thereby exhausting cylinder 106 and causing pistons 90, 92 and rack 100 to shift to the left (Fig. 10) for turning shaft 120 in a clockwise direction for tilting shoe 20 in a clockwise direction in Fig. 13. Conversely, movement of shaft 48 to the right will connect cylinder 106 to pressure port 84 for shifting pistons 90, 92 and rack 100 to the right for turning shaft 120 in a counter-clockwise direction which will tilt shoe 20 (Fig. 13) in a counter-clockwise direction.

In Figs. 2 and 3 cyclic axial movement is imparted to shaft 150 by means of cam 152, which engages end 154 of the shaft. In the preferred embodiment of the invention the eccentricity of cam 152 may be varied, by any suitable means not pertinent to the subject invention. Rotation of cam 152 may be effected by means of motor 156 suitably fastened, by means of bracket 158, to structural support 160 of the belt grinder.

It will be understood that rotation of cam 152 will effect oscillation of shaft 150 which will be transmitted to socket 46 and thence to sleeve 54 and spool 38 for actuating shoe 20 for imparting cyclic sidewise movement of belt 22 as explained above.

The numeral 163 (Fig. 2) denotes generally any suitable source of pressure media, such as, by way of example, a fluid pump driven by motor 165. The numerals 167 and 169 denote pressure and exhaust conduits which are in open communication with pressure and exhaust lines 94 and 104, respectively, note Fig. 5.

Figure 1:
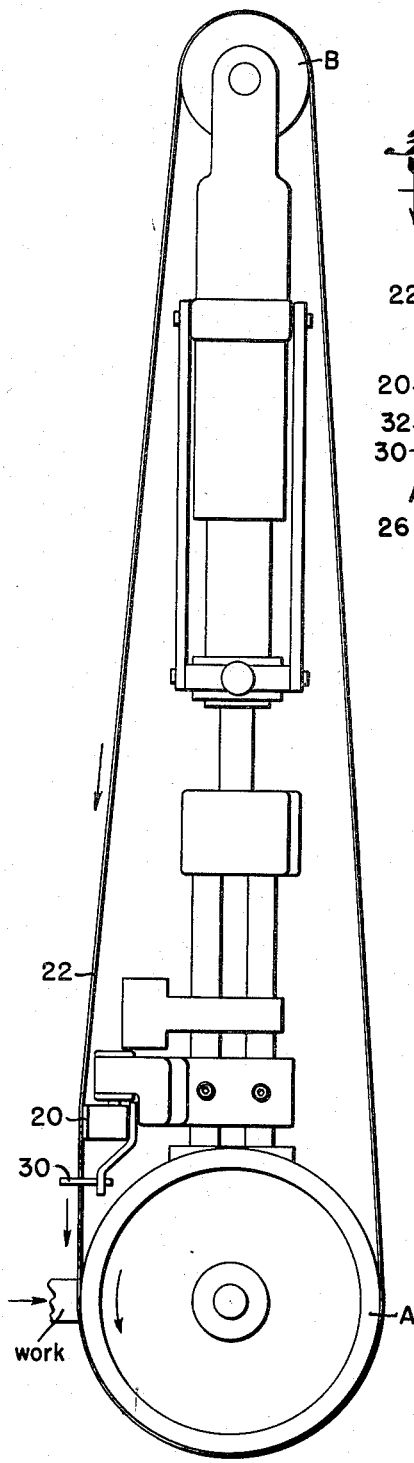
Fig. 1 is a side view of a belt grinder provided with a servo tracking device embodying the teachings of the present invention.

It should be understood that the grinder illustrated in Figs. 1–3 is merely an exemplary, rather than a restrictive illustration of the use to which the servo tracking device may be put. In Fig. 1 the letters A and B denote generally spaced pulleys over which an endless belt 22 passes, one or both of said pulleys being suitably driven by means not pertinent to the subject disclosure.

From the foregoing it will be noted that the subject device is selectively operable either for fully automatic, servo operation, wherein all motion of the tracking shoe 20 is initiated by reason of belt-actuated movement of finger 30. When thus used the device will automatically and efficiently maintain an endless belt passing thereover in predetermined axial alignment.

When it is desired to utilize the device for imparting a regular, periodic, or cyclic motion to the tracking shoe for shifting belt 22 sidewise thereon, suitable means, such as, by way of example, cam 152, may be utilized for imparting valve actuating movement to the servo valve for superseding the finger-actuated control of the valve. Finger 30 will, of course, always bear against an edge of belt 22, however the controlling motion of said finger for actuating valve spool 38 relative to sleeve 54 is superseded by movement of the sleeve relative to the spool via movement of sockets 46 and 56.

The phrase "endless member" as used in the specification and claims refers not only to endless members in a strict or literal sense, but is likewise meant to include and comprehend continuous lengths of strip material having appreciable width such as, by way of example, strips of paper, metal, etc.

To summarize, it will be noted that the subject servo belt tracker comprises a hydraulically actuated feed back mechanism in which a finger 30, loaded by spring 40 with about one ounce force against edge 26 of belt 22, controls the position of the servo plunger which in turn controls the flow of oil to a cylinder actuating a shoe 20 over which the back of the belt travels. As the belt moves out of its predetermined path, the movement is transmitted mechanically to the servo valve plunger. Plunger movement directs oil, under pressure, to position the tracking shoe, urging the belt back toward the correct path. As the belt moves back, the feeler finger 30 follows, thus neutralizing the servo plunger displacement. This system has proved to be a highly efficient means for controlling the belt path within a few thousandths.

It should be understood that various changes in the structural details of the device may be made, within the scope of the appended claims, without departing from the spirit of the invention.

What is claimed is:

1. A tracking device for endless members, said device comprising a tiltable tracking shoe adapted to support and guide an endless member passing thereover, an oscillatable finger adapted to bear against the side edge of said endless member, a reciprocable member, driving means connecting the motor to the shoe, said driving means adapted to convert the lineal motion of the motor into turning motion of the shoe, motor control means adapted to control the operating characteristics of the motor, and means connecting the finger to the motor control means for translating movement of the finger induced by sidewise movement of the belt relative to the shoe into movement of the motor control, whereby the motor is actuated for tilting the shoe to shift the endless member sidewise thereof.

2. A tracking device for endless members, said device comprising a tiltable tracking shoe adapted to support and guide an endless member passing thereover, an oscillatable finger adapted to bear against a side edge of said endless member, means yieldably maintaining said finger in contacting relationship with the edge of the endless member, a reciprocable motor, driving means connecting the motor to the tracking shoe, said driving means adapted to convert the lineal motion of the motor into turning motion of the shoe, a servo valve adapted to selectively control the operating cycle and direction of reciprocation of the motor, and means connecting the finger relative to the valve for translating movement of the finger to control and actuate the servo valve whereby the motor is actuated for tilting the tracking shoe to shift the endless member sidewise thereof.

3. A tracking device for an endless belt, said device comprising a tiltable tracking shoe adapted to support and guide an endless belt passing thereover, an oscillatable finger adapted to bear against the side edge of said belt, a reciprocable motor, driving means connecting the motor to the shoe, said driving means adapted to convert the lineal motion of the motor into tilting motion of the shoe, a servo valve including a reciprocable spool, said valve being adapted to control the operating cycle and direction of reciprocation of the motor, and means connecting the finger relative to the valve spool for translating belt-induced movement of the finger into axial movement of the valve spool, whereby the motor is selectively actuated for tilting the shoe to shift the belt sidewise thereof.

4. A tracking device for an endless belt, said device comprising a tiltable tracking shoe adapted to support and guide an endless belt passing thereover, an oscillatable finger adapted to bear against a side edge of said belt, means yieldably maintaining said finger in contacting relationship with the edge of the belt, a reciprocable motor, driving means connecting the motor to the tracking shoe, said driving means adapted to convert the lineal motion of the motor into turning motion of the shoe, a servo valve, said valve including a spool and a sleeve having a spool-receptive bore therein, said bore including ports, said spool mounted for axial movement within the bore of the sleeve and having lands for co-operation with the sleeve ports for selectively controlling the operating cycle and direction of reciprocation of the motor, and means connecting the finger relative to the spool for translating movement of the finger to axial movement of the spool, whereby the motor is actuated for tilting the tracking shoe to shift the belt sidewise thereof.

5. A tracking device for an endless belt, said device comprising a tiltable tracking shoe adapted to support and guide an endless belt passing thereover, an oscillatable finger adapted to bear against the side edge of said belt, a reciprocable piston-type motor, driving means connecting the motor to the shoe, said driving means adapted to convert the lineal motion of the motor into turning motion of the shoe, a servo valve including a spool and a reciprocable sleeve having a spool-receptive bore therein, said sleeve including ports, said spool having lands adapted to co-operate with the ports of the sleeve and being adapted to control the operation and direction of reciprocation of the motor by controlling the flow of actuating media to the motor, a lever engaging the spool, means connecting the finger to the lever for translating movement of the finger to movement of the lever for shifting the spool relative to the sleeve, and yieldable means normally shifting the spool in one direction relative to the sleeve, said means comprising the sole means for yieldably maintaining the finger in contacting relationship with the edge of the belt.

6. A tracking device as described in claim 5, wherein the length of the tracking shoe is at least equal to the width of the endless belt controlled thereby, and wherein the said driving means comprises the sole support for the said shoe.

7. A tracking device for an endless belt, said device comprising a tiltable tracking shoe adapted to guide an endless belt passing thereover, and a housing including an oscillatable finger adapted to bear against a side edge of said belt, means yieldably maintaining said finger in contacting relationship with the edge of the belt, a fluid actuated reciprocable motor, driving means including a shaft projecting from the housing connecting the motor to the tracking shoe which is secured to and carried by said shaft, said driving means adapted to convert the lineal motion of the motor into turning motion of the shoe, a servo valve, said valve adapted to control the flow of actuating fluid to said motor for selectively controlling the operating cycle and direction of reciprocation of the motor, and means including a second shaft projecting from the housing connecting the finger which is secured to and carried by the second shaft in actuating relationship with the valve.

8. A tracking device for an endless belt, said device comprising a tiltable tracking shoe adapted to support and guide an endless belt passing thereover, an oscillatable finger adapted to bear against the side edge of said belt adjacent the shoe, a fluid actuated reciprocable motor, driving means connecting the motor to the shoe, said driving means adapted to convert the lineal motion of the motor into turning motion of the shoe, a servo valve including a spool and a sleeve having a spool-receptive bore therein, said sleeve including ports, said spool having lands adapted to co-operate with the ports of the sleeve and being adapted to control the operation and direction of reciprocation of the motor by controlling the flow of actuating fluid to the motor, means operatively interconnecting the finger to the spool for shifting the spool relative to the sleeve, and means mounting the sleeve for axial movement relative to the spool.

9. A tracking device for an endless belt, said device comprising a tiltable tracking shoe adapted to support and guide an endless belt passing thereover, an oscillatable finger adapted to bear against a side edge of the belt, a fluid-actuated reciprocable motor, driving means connecting the motor to the shoe, said driving means adapted to convert the lineal motion of the motor into turning motion of the shoe, a servo valve, said valve including a housing, a spool, and a sleeve having a spool-receptive bore therein, said sleeve including ports, said spool having lands adapted to co-operate with the ports of the sleeve and being adapted to control the operation and direction of reciprocation of the motor by controlling the flow of actuating fluid to the motor, means operatively connecting the finger to the spool for shifting the spool relative to the sleeve, yieldable means normally shifting the spool in one direction relative to the sleeve, said means comprising the sole agency for yieldably maintaining the finger in contacting relationship with the edge of the belt, means mounting the sleeve for axial movement relative to the housing and spool, and means operable to impart axial movement to the sleeve.

10. A tracking device for an endless belt, said device comprising a tiltable tracking shoe adapted to support and guide an endless belt passing thereover, an oscillatable finger adapted to bear against a side edge of the belt, a fluid-actuated reciprocable motor, driving means connecting the motor to the shoe, said driving means adapted to convert the lineal motion of the motor into turning motion of the shoe, a servo valve, said valve including a housing, a spool and a sleeve having a spool-receptive bore therein, said sleeve including ports, said spool having lands adapted to co-operate with the ports of the sleeve and being adapted to control the operation and direction of reciprocation of the motor by controlling the flow of actuating fluid to the motor, means operatively connecting the finger to the spool for shifting the spool relative to the sleeve, yieldable means normally shifting the spool in one direction relative to the sleeve, said means comprising the sole agency for yieldably maintaining the finger in contacting relationship with the edge of the belt, means mounting the sleeve for axial movement relative to the housing and spool, yieldable means normally shifting the sleeve in one direction relative to the housing and spool, and means operable to impart axial movement to the sleeve for altering the initial relationship between the ports and lands.

11. A tracking device for an endless belt, said device selectively operable for belt-induced and cyclic operation and comprising a tiltable tracking shoe adapted to support and guide an endless belt passing thereover, a fluid actuated reciprocable motor, driving means connecting the motor to the tracking shoe, said driving means adapted to convert the lineal motion of the motor into turning motion of the shoe, a servo valve, said valve adapted to control the flow of actuating fluid to said motor for selectively controlling the operating cycle and direction of reciprocation of the motor, an oscillatable finger adapted to bear against a side edge of said belt, means connecting the finger in actuating relationship with the valve for translating belt-induced movement of the finger to tilting movement of the shoe, other means in actuating relationship with the valve, drive means for imparting cyclic operation to said last mentioned means for imparting periodic tilting movement to the shoe, said last mentioned valve actuating means, when actuated, superseding the finger actuated control of the valve.

References Cited in the file of this patent

UNITED STATES PATENTS

| | | |
|---|---|---|
| 2,114,716 | Kunzle | Apr. 19, 1938 |
| 2,182,928 | Mehaffey | Dec. 12, 1939 |
| 2,331,030 | King | Oct. 5, 1943 |
| 2,587,603 | Czarnecki | Mar. 4, 1952 |
| 2,597,256 | Murray | May 20, 1952 |